United States Patent
Suzuki et al.

(10) Patent No.: US 7,059,781 B2
(45) Date of Patent: Jun. 13, 2006

(54) OPTICAL DETECTION DEVICE AND OPTICAL DEVICE

(75) Inventors: Toshiaki Suzuki, Suwa-gun (JP); Koichi Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/872,497

(22) Filed: Jun. 22, 2004

(65) Prior Publication Data

US 2004/0264839 A1    Dec. 30, 2004

(30) Foreign Application Priority Data

Jun. 24, 2003   (JP)   ............................. 2003-179646

(51) Int. Cl.
*G02B 6/36*   (2006.01)
(52) U.S. Cl. ............................. 385/93; 385/92; 385/88
(58) Field of Classification Search .................. 385/52, 385/88, 89, 90, 91, 92, 93, 94
See application file for complete search history.

(56) References Cited

U.S. PATENT DOCUMENTS

| | | | | |
|---|---|---|---|---|
| 4,468,119 A | * | 8/1984 | Hamar | 356/152.1 |
| 4,480,914 A | * | 11/1984 | Thompson et al. | 356/452 |
| 5,101,393 A | * | 3/1992 | Marshall | 369/44.37 |
| 6,873,446 B1 | * | 3/2005 | Owen | 359/210 |

FOREIGN PATENT DOCUMENTS

JP          05-122155          5/1999          ............... 385/88 X

* cited by examiner

*Primary Examiner*—Brian M. Healy
(74) *Attorney, Agent, or Firm*—Kenyon & Kenyon LLP

(57) ABSTRACT

An optical detection device is provided with an optical path dividing section which is disposed on an optical path toward a light receiving surface which receives an optical beam. The optical path dividing section is provided with an aperture section through which an optical beam passes through under condition that an optical axis of the optical beam coincides a predetermined optical axis which is disposed toward the light receiving surface and an optical element which is disposed around the aperture section so as to reflect a part of the optical bam when the optical axis of the optical beam is deviated from the predetermined optical axis. By doing this, it is possible to detect a wide range of light by a simple structure without loss in the optical detection device and the optical system.

12 Claims, 8 Drawing Sheets

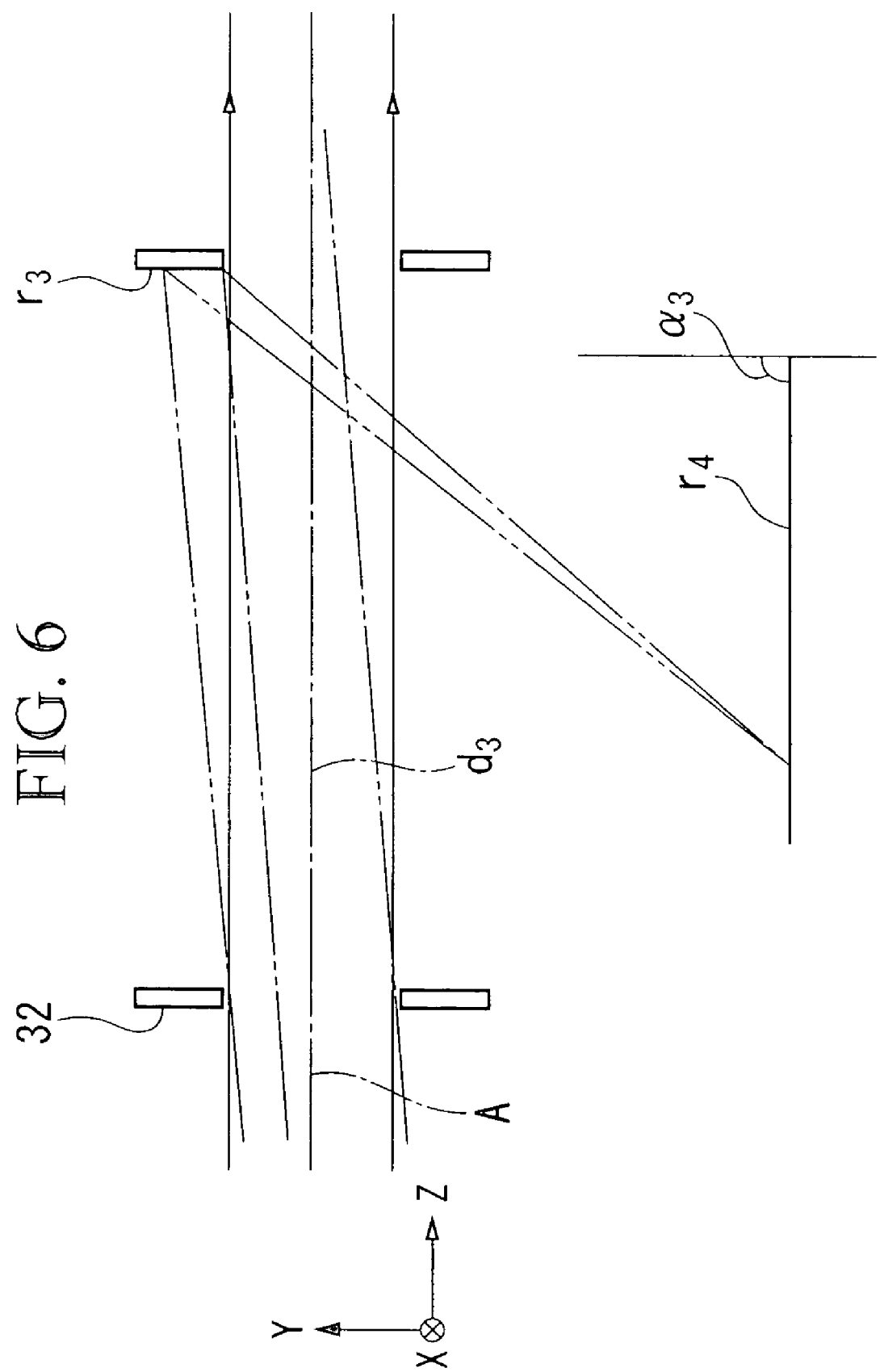

OPTICAL DETECTION DEVICE AND OPTICAL DEVICE

The present application is based on patent application No. 2003-179646 filed Jun. 24, 2003 in Japan, the content of which is incorporated herein by reference.

BACKGROUND OF THE INVENTION

1. Field of the Invention

The present invention relate to an optical detection device and an optical device which uses the optical detection device. In particular, the present invention relates to an optical detection device for detecting an inclination of an optical axis of a light-capturing-receiving device and an optical device which uses the optical detection device.

2. Description of Related Art

Conventionally, there has been an optical detection device which divides a part of an optical beam y a beam splitter such that the divided optical beam should be received by an optical sensor such as a four-division detector so as to detect a direction of an inclination of the optical axis of the optical beam according to a position of a received optical spot. According to such a method, a part of the received light is used for detecting an inclination of the optical axis on regular basis when such a method is used for an aerial optical communication which has a function for capturing a light. Therefore, there is a disadvantage in that the intensity of the received light which is detected by the light receiving element may be reduced. In particular, in a long distance communication, the received light itself has a weak intensity. If a light for detecting an inclination is separated from such a light, the intensity of the light which is received by the light receiving element is extremely weak; thus, an S/N ratio may be reduced.

Here, a method is proposed for detecting a light in which an optical sensor such as a four-division detector is not used (for example, Japanese Unexamined Patent Application, First Publication No. Hei 5-122155). The device which is used for a method which is disclosed in Japanese Unexamined Patent Application, First Publication No. Hei 5-122155 for detecting a light is provided with a vertical driving mirror 1 which is driven in a tilting manner in a vertical direction, a horizontal driving mirror 2 which is driven in a tilting manner in a horizontal direction, a light receiving lens 3, and a light receiving element 4. In order to detect and compensate the inclination of the optical axis by using this device, the horizontal driving mirror 1 and the horizontal driving mirror 2 are driven by a two-dimensional control by a control voltage at first. By doing this, the optical spot which is received on the light receiving element 4 describes a circular track while moving on the light receiving element 4. In such a case, the detected signal which is detected by the light receiving element 4 fluctuates periodically according to a degree that the optical spot exceeds from the light receiving element 4 as shown in FIG. 7. On the other hand, if the optical spot does not exceed from the light receiving element 4, the detected signal is constant. Therefore, it is possible to detect the light without loss by adjusting the angles of the mirrors 1 and 2 such that the level of the detected signal should not fluctuate. Therefore, the light receiving element 4 serves for detecting the shifting of the optical axis and the optical signals compatibly; thus, an element for decreasing the light amount is not necessary. Therefore, there is not a loss which is caused by the received light.

However, a high speed response is required to the light receiving element 4 for detecting the signals; therefore, it is necessary to reduce a capacity for the light receiving element 4; thus, the are for receiving the light is small in general. Also, it is a presupposition that a part of the optical spot must overlap in the light-receiving area so as to perform the detecting operation without losing the light; therefore, a range for detecting the shifting amount of the optical axis may be narrowed.

Therefore, it is a phenomenon in which it is not possible to deal with a case in which there is a wide range of the incident angle.

SUMMARY OF THE INVENTION

The present invention provides an optical detection device which comprises an optical path dividing section which is disposed on an optical path toward a light condensing surface which condenses an optical beam, and a light receiving element which receives the optical beam which is divided by the optical path dividing section such that the optical path dividing section is provided with an aperture section through which an optical beam passes through under condition that an optical axis of the optical beam coincides a predetermined optical axis which is disposed toward the light receiving surface and an optical element which is disposed around the aperture section so as to reflect a part of the optical bam when the optical axis of the optical beam is deviated from the predetermined optical axis.

According to this invention, the received optical beam passes through an aperture section before reaching to the light receiving surface. If the optical axis of the optical beam coincides the predetermined optical axis, the entire optical beam passes through the aperture section so as to be received in the light condensing surface without loss. Therefore, there is not a loss in the detected light. On the other hand, if the optical axis of the optical beam is different from the predetermined optical axis, a part of the optical beam exceeds from the aperture section. The optical element is provided around the aperture section; therefore, the exceeded light is reflected by the optical element so as to be detected by the light receiving element.

In the present invention, it is preferable that the optical element is provided with a light-condensing function.

In the present invention, it is preferable that the optical element is formed by a prism which is provided with a reflecting surface on a surface of the prism and a curved surface which has a function such that optical beam which is reflected by the reflecting surface should be condensed on the light-receiving element.

In the present invention, it is preferable that the optical element has a rotatively asymmetric power for the predetermined optical axis.

In the present invention, it is preferable that the optical element has a surface which has a rotatively asymmetric power.

In the present invention, it is preferable that the optical element includes an aspherical reflecting surface.

In the present invention, it is preferable that the optical element includes a fresnel surface.

In the present invention, it is preferable that the optical element includes a refracting surface.

In the present invention, it is preferable that the optical element has a surface which is slanted or decentralized with reference to the predetermined optical axis.

In the present invention, in the optical detection device which is provided with the optical detection device comprises a control device for adjusting an incident angle of the optical beam into the optical path dividing device so as to coincide the predetermined optical axis according to the detection signal by the optical element in the optical detection device.

In the present invention, it is preferable that an optical device comprise the optical detection device and a deflection-angle-adjustable optical deflecting element for deflecting the optical beam such that the control device controls the deflection angle which is deflected by the deflection-angle-adjustable optical deflecting element.

In the present invention, it is preferable that in an optical device which is provided with the optical detection device, the optical detection device is mounted on a stage and the control device adjusts an angle of the stage.

BRIEF DESCRIPTION OF THE DRAWINGS

FIG. 6 is a view for an optical path in an optical system for a case in which a refracting reflecting surface is used for an optical element in the optical detection device and the optical system according to the present invention.

DETAILED DESCRIPTION OF THE INVENTION

Figure 1:
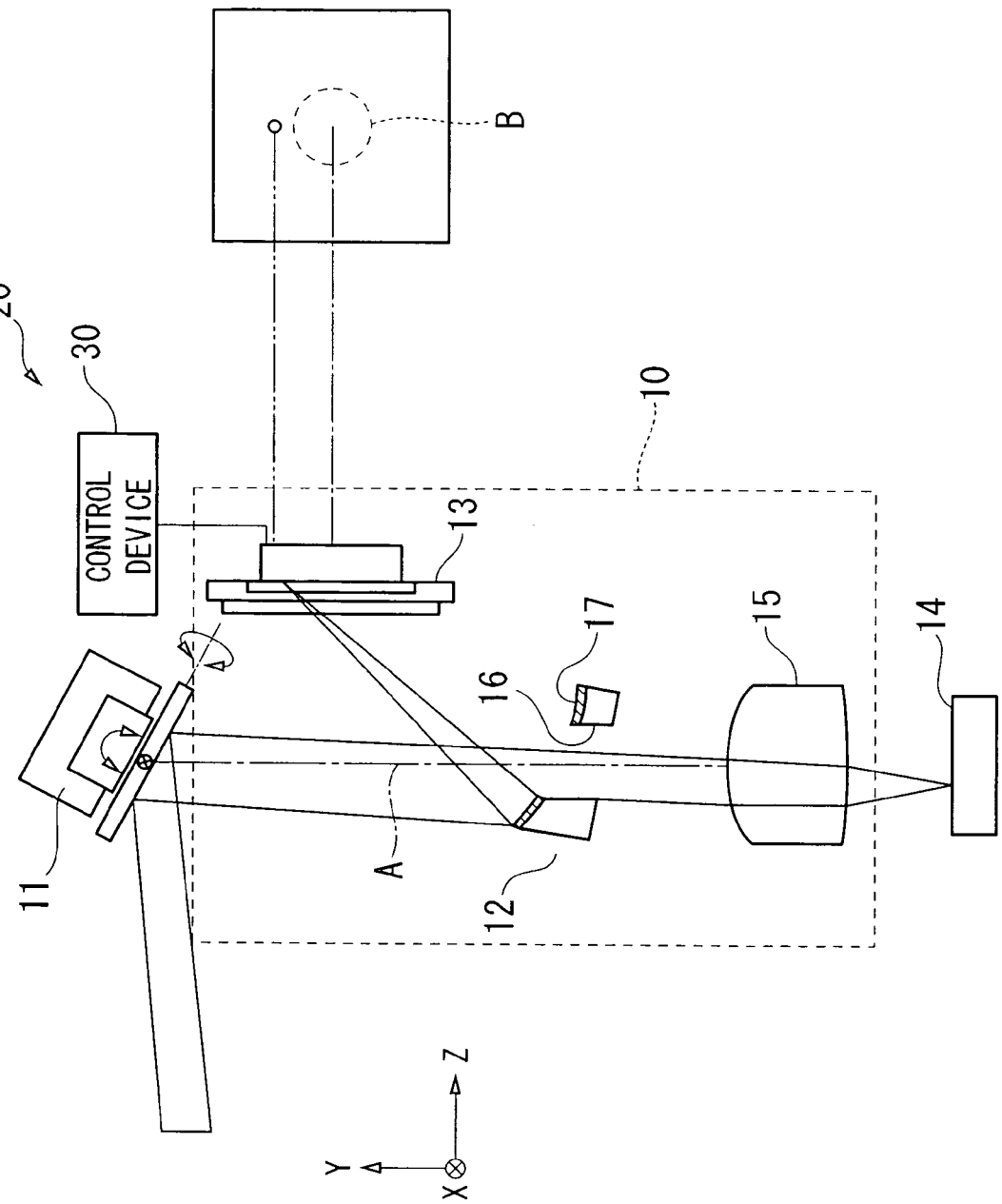
FIG. 1 is a view for a general structure of an optical detection device and an optical system according to a first embodiment of the present invention for a case in which there is a large deviation between the optical axis of the signal light beam and the predetermined optical axis.

Hereinafter, an optical system according to a first embodiment of the present invention is explained with reference to drawings.

An optical system 20 according to the present embodiment is a system for receiving a light which is transmitted externally. A shown in FIG. 1, the optical system 20 is provided with an optical detection device 10, an optical deflecting element (galvano-mirror) 11 which is disposed on an optical path for the signal light beam, and a control device (control section) 30 which is connected to the optical detection device 10 and the galvano mirror 11.

The above optical detection device 10 is provided with an optical path deviding section (optical path dividing device) 12 for dividing a light which is reflected by the galvano mirror 11, a CCD (light receiving element) 13 for receiving a part of a signal light beam which is divided by the optical path dividing section 12, and a light receiving lens 15 by which the signal light beam is received on a light receiving surface 14.

The above optical path dividing section 12 is disposed between the galvano mirror 11 and the light receiving lens 15. Also, the optical path dividing section 12 is provided with an aperture section 16 which has an inner diameter which is slightly larger than a diameter of the signal light beam and an optical element 17 which is disposed around the aperture section 16 near an incident signal light beam.

In the drawing, a letter A indicates a reference optical axis (predetermined optical axis) which serves for a central axis of a signal light beam while the entire signal light beam passes through the aperture section 16.

The above optical element 17 is formed by a concave reflecting mirror on surface of which a reflecting coating is formed. The optical element 17 is formed in a decentralized aspherical concave surface so as to serve for reflecting and receiving the incident light.

The above CCD 13 is disposed near a focal position of the optical element 17. By doing this, the light which is received by the CCD 13 is detected for an optical spot.

In the drawing, a letter B indicates an area in which a light which is reflected in the area is received under condition that a reflecting mirror is formed in the aperture section 16 in the optical element 17. The aperture section 16 is disposed actually; therefore, the optical spot is not formed in the area B. The optical axis of the signal light beam is deviated from the reference optical axis A. By doing this, optical spot is formed around the area B when the signal light beam exceeds from the aperture section 16.

The above galvano mirror 11 is rotative around centers of an X axis and a Y axis so as to be driven in a tilting manner in a desirable angle direction.

Also, the galvano mirror 11 and the CCD 13 are connected to the control device 30.

The control device 30 can detect a direction of an inclination of the signal light beam and an amount of the inclination according to a position of the optical spot which is received by the CCD 13.

By doing this, the control device 30 drives the galvano mirror 11 in a direction in which the optical spot is disposed toward the area B according to the detection signal which is received by the CCE 13.

Operations in the optical system which is formed in this way in the present embodiment is explained as follows.

The signal light beam is incident into the galvano mirror 11 in order to receive the light which is transmitted externally by using the optical system 20 according to the present embodiment. The galvano mirror 11 deflects the incident light toward the light receiving surface 14. In such a case, for example, as shown in FIG. 1, if there is a large deviation between the optical axis of the signal light beam and the reference optical axis A, the beam on an outside of the signal light beam exceeds from the aperture section 16. The optical element 17 is provided around the aperture section 16; therefore, the exceeded light is reflected toward the CCD 13 on a surface of the optical element 17. The optical element 17 has a function for receiving a light; therefore, the reflected light converges; thus, an image for the optical spot is formed outside of the area B in the CCD 13.

When the optical spot is formed on the CCD 13, the direction of the inclination of the signal light beam and the amount of the inclination of the signal light beam are measured by the control device 30 according to the position of the optical spot. Consequently, the control device 30 rotates the galvano mirror 11 around the X axis and the Y axis according to the measured result such that the optical spot should not be detected in the CCD 13.

Figure 2:
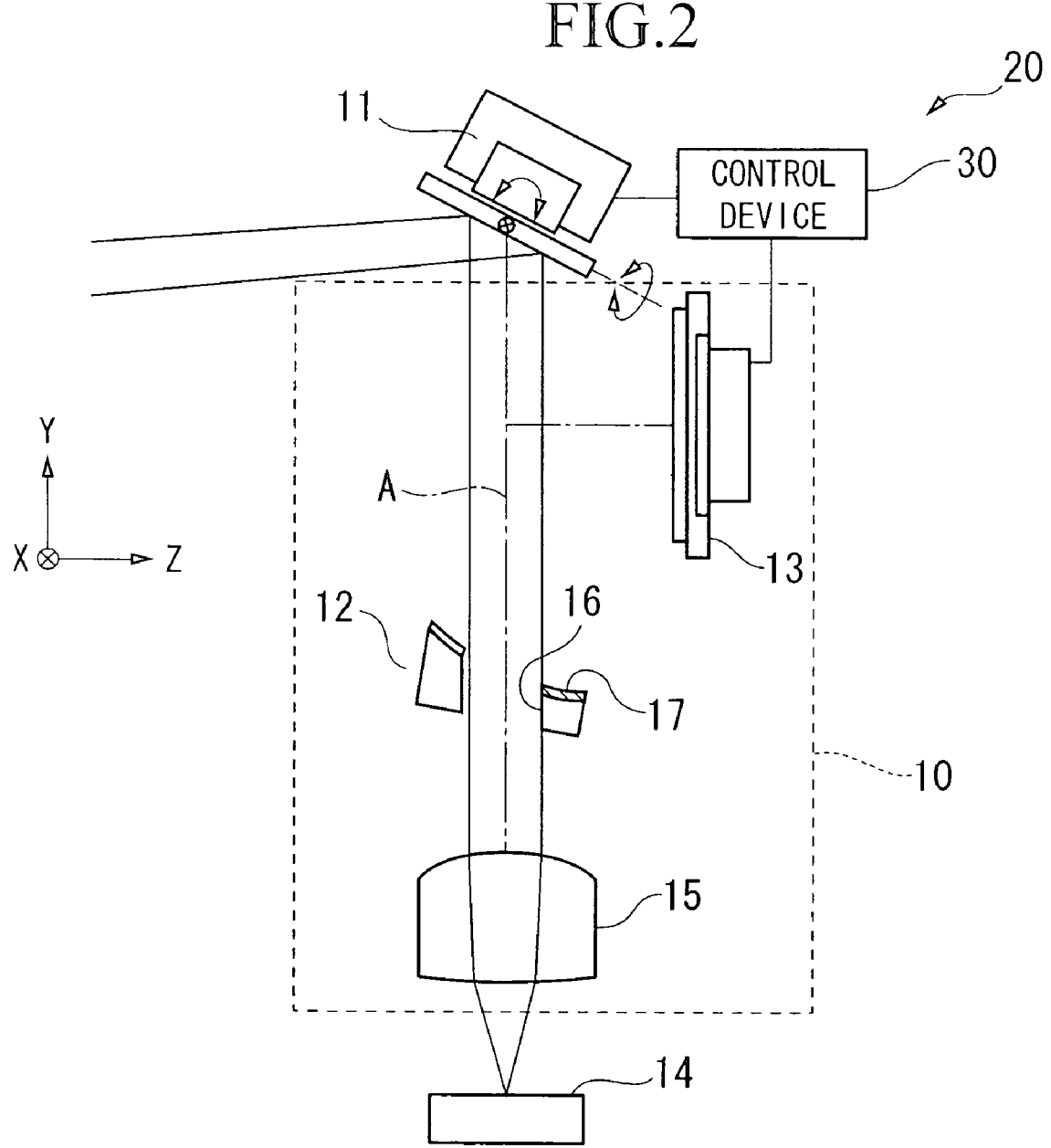
FIG. 2 is a view for a general structure of an optical detection device and an optical system according to a first embodiment of the present invention for a case in which there is a small deviation between the optical axis of the signal light beam and the predetermined optical axis.

By such an operation, as shown in FIG. 2, all the beams in the signal light beam are forced to be disposed inside the aperture section 16. Under such a condition, the optical axis of the signal light beam and the reference optical axis A coincide with each other approximately; thus, all the signal light beams are received on a light receiving surface 14 by the light receiving lens 15.

That is, the optical system 20 according to the present embodiment can measure the deviation of the optical axis in a wide range by the CCD 13 even if there is a large deviation between the optical axis of the signal light beam and the reference optical axis A such that the light exceeds the light receiving surface 14. Also, it is possible to detect all the lights in the light receiving surface 14 by driving the galvano mirror 11 by the control device 30 so as to compensate the deviation of the optical axis. By doing this, it is desirable for detecting a weak signal light in a long distance optical aerial transmission communication system in which a fluctuation of the incident angle of the signal light beam because there is not a loss in the signal light at all.

Here, in the present embodiment, the surface shape of the optical element 17 is formed in a decentralized aspherical concave surface. However, a decentralized fresnel lens surface, a surface which has a non-rotative asymmetric power, and a diffractive optical element (DOE) can be used in the present embodiment; that is, essential feature of the present embodiment is not limited by such a surface shape. Also, it is acceptable if the optical element 17 is slanted or decentralized with reference to the predetermined reference optical axis A.

Also, it is acceptable if the optical detection device 10 be mounted on the stage in place of the galvano mirror 11 which deflects a signal light beam. By doing this, it is possible to adjust the angle of the stage by the control device so as to coincide the optical axis of the signal light beam and the reference optical axis A.

Also, if an accuracy for measuring the deviation between the optical axis of the optical beam and the reference optical axis A is not satisfactory, it is anticipated such an undesirable accuracy is supposed to be caused by various cases such that, for example, a loose clearance between the light flux and the aperture section 16 is set by taking a manufacturing tolerance for the optical path dividing section 12 into account, a core diameter of the light receiving surface 14 of an optical fiber is small, or a resolution for detecting a spot position is not satisfactory because there are fewer pixels in the CCD 13. In such a case, it is not possible to measure the slight deviation of optical axis by the above explained CCD 13. Thus, it is anticipated that the optical spot which is received by the light receiving lens 15 may exceed from the light receiving surface 14. It is necessary to perform the above operations and compensate the inclination of the optical axis furthermore accurately in order to avoid such undesirable situation.

Figure 3A:
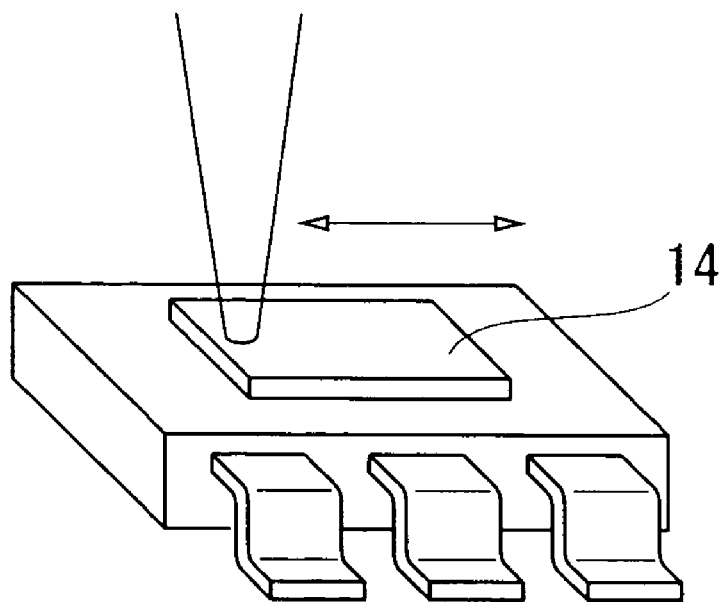
FIGS. 3A and 3B are views for cases in which an optical beam is received on a light receiving surface of the optical detection device and the optical system shown in FIG 1.
Figure 3B:
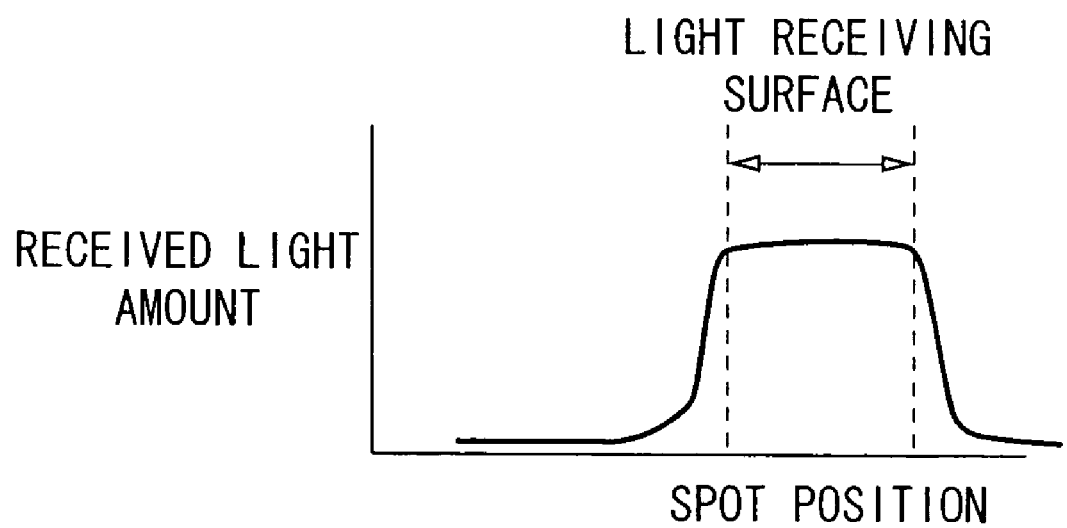

In such a case, the inclination of the optical axis of the signal light beam which is reflected by the galvano mirror 11 in a two-dimension manner by moving the galvano mirror 11 slightly. In such a case, if the position of the optical spot is disposed in the light receiving surface 14 as shown in FIG. 3A, an output of the light is detected. If only a part of the output of the light exceeds, the amount of the light is reduced. By doing this, the relationship between the position of the optical spot and the receiving amount of the light is shown graphically in a rectangular shape shown in FIG. 3B. If the galvano mirror 11 is moved intentionally slightly in this way, the amount of the light which is detected fluctuates. Therefore, it is possible to know a central position of the light receiving surface 14 by performing a calculation in the control device 30 according to a direction in which the optical spot moves toward such a fluctuating position and an information for such an amount of the movement. By doing this, it is possible to force the optical spot into inside of the light receiving surface 14 by moving the galvano mirror 11.

Hereinafter, an optical system according to a second embodiment of the present invention is explained with reference to drawings. Here, the same reference numerals are added to the members in the second embodiment which are the same as those in the first embodiment so as to omit duplications in the explanation.

Figure 4:
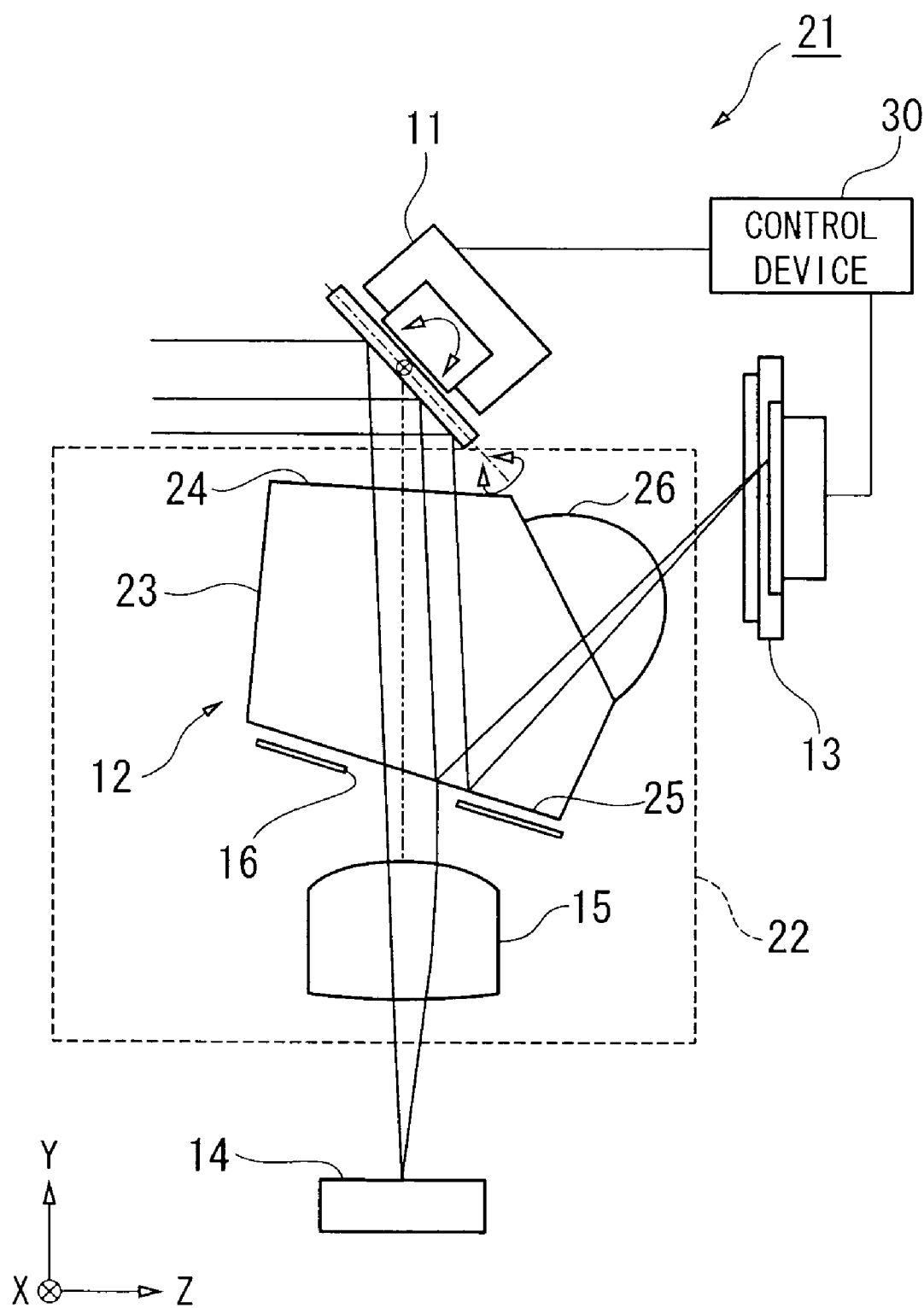
FIG. 4 is a view for an optical path in an entire structure of the optical detection device and the optical system according to a second embodiment of the present invention.

As shown in FIG. 4, an optical system 21 according to the present embodiment is different from the optical system 20 in the first embodiment in that the an optical element 17 which is provided in an optical detection device 22 is a prism 23.

The prism 23 is provided with an incident surface 24 into which the signal light beam is incident, a reflecting surface 25 which is provided around the aperture section 16, and a lens surface (curved surface) 26 which has a function such that the optical beam which is reflected by the reflecting surface 25 is received by the CCD 13. Here, a reflective coating is formed in a ring manner on the reflecting surface 25 so as to reflect a part of the incident light.

The lens surface 26 is formed so as to face the CCD 13.

Operations in the optical detection device and the optical system which are formed in this way are explained as follows.

The signal light beam is incident into the galvano mirror 11 in order to receive the light which is transmitted externally by using the optical system 21 according to the present embodiment. The signal light beam which is deflected by the galvano mirror 11 is incident into the incident surface 24. In such a case, if there is a great deviation between the signal light beam and the reference optical axis A, the light on an outside of the signal light beam exceeds from the aperture section 16. The exceeded light is reflected on the reflecting surface 25 which is provided around the aperture section 16 so as to be disposed toward the lens surface 26. The lens surface 26 has a function for receiving a light; therefore, the reflected light is converged. Thus, an image of the optical spot is formed in the CCD 13. Therefore, all the signal light beams are received in the light receiving surface 14 by driving the galvano mirror 11 by the control device 30 in a similar manner to the first embodiment.

That is, the optical system 21 according to the present embodiment can allocate a reflecting function and a light-receiving function onto different surfaces because a prism 23 is used. Therefore, the light flux of the signal light beam is disposed so as to via three surfaces such as the incident surface, the reflecting surface 25, and the lens surface 26. Therefore, the structure of the present invention is not limited by the present embodiment. That is, it is possible to set the inclinations for these surface and curvatures desirably without being limited by the above limitation for the structure. Therefore, there are effects in that it is possible to obtain a redundancy for the position in a layout of the CCD 13 and it is possible to reduce aberrations.

Hereinafter, example for specific limitations in the optical element are shown below which can be used for the optical system according to the embodiments of the present invention.

In tables below for showing numerical data, each character indicates a follows. "$r_i$" indicates a curvature. "$d_i$"

indicates an interval between surfaces. "$n_i$" indicates a refractive index. "vi" is an abbe constant. Here, "i" is an integer. Relationships for these characters such as $r_i$, $d_i$, and $n_i$ shown in numerical data are shown in each view for the optical paths below.

Here, it is defined as a rotative symmetric aspherical surface if an aspherical shape is mentioned.

$$Z=(y^2/R)/[1+\{1-(1+k)y^2/R^2\}^{1/2}]+ay^4+by^6+cy^3+dy^{10}+ \quad (a)$$

Here, Z indicates an optical axis (axial principal light) in which a direction of a progressing light indicates a positive direction. "y" is disposed so as to be orthogonal to the optical axis. Here, "R" indicates a radius for a paraxial curvature. "k" indicates a conical constant. Characters such as a, b, c, d, . . . indicate four-dimensional aspherical coefficient, sixth-dimensional aspherical coefficient, eighth-dimensional aspherical coefficient, and tenth-dimensional aspherical coefficient. A Z axis in this definition formula indicates an axis in the rotatively symmetric aspherical surface. Here, an item which relates to an aspherical surface in which there is not a datum is filled indicates 0 (zero).

Also, axes are defined as follows for tracking the light. Z axis is defined s a direction which is along an axial principal light such that a center of an entrance pupil is a reference point in the optical system in the optical detection device. A positive direction of the Z axis indicates a direction from an object toward a surface which faces the decentralized optical surface in the optical system in the optical detection device. A surface of the drawing which is currently viewed by the viewer indicates a Y-Z surface. A positive direction of the X axis is a direction which is directed from a top surface of the drawing which is currently viewed by the viewer to a bottom surface of the drawing so as to be orthogonal to the Y-Z surface via the reference point. Y axis is indicated by an axis which forms an orthogonal coordinate system which is directed in a right-hand direction by the X axis and the Z axis.

The decentralized surface is added factors such as an amount of decentralization between the center of the reference point in the optical system to the position of peaks in the surface (X axis direction, Y axis direction, and Z axis direction are indicated by X, Y, and Z respectively) and angles or the inclination ($\alpha$, $\beta$, and $\gamma$ (°) respectively) of a central axis in the surface (Z axis shown in the above formula (b) is added for the aspherical surface) such that the X axis, Y axis, and the Z axis are the centers for the inclinations. In such a case, a positive direction for $\alpha$ and $\beta$ indicates a counter-clock-wise direction against a positive direction for each axis. A positive direction of $\gamma$ indicates a clock-wise direction against the positive direction of the Z axis. Here, the central axes such as $\alpha$, $\beta$, and $\gamma$ are rotated such that the central axes of the surface and its XYZ orthogonal coordinate system should be rotated around the X axis at first in a counter-clock-wise direction by $\alpha$°. Next, the central axis of the rotated surface is rotated around the Y axis of a new coordinate system by $\beta$°. After that, the coordinate system which is once already rotated is further rotated around the Y axis by $\beta$°. Consequently, the central axis of the surface which is rotated twice is rotated around the Z axis of a new coordinate system in a clock-wise direction by $\gamma$°.

Also, the first item in the above formula (a) indicates a spherical surface item. Latter items after the second item indicate free-curved surface items. Free-curved items are indicated by following formula.

$$\sum_{j=1}^{66} C_j X^m Y^n = C_1 + C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

Here, $C_i$ ($i$ is an integer) indicates a coefficient.

In general, the above free-curved surfaces such as X-Z surface and Y-Z surface do not have a symmetric surface. In the present embodiment, it is possible to form a free-curved surface in which there is only a symmetric surface which is parallel with the Y-Z surface when odd number items are set to be 0 (zero). For example, in the above definition formula (a), such a free-curved surface can be formed if coefficients in the items $C_2$, $C_5$, $C_7$, $C_9$, $C_{12}$, $C_{14}$, $C_{16}$, $C_{18}$, $C_{23}$, $C_{25}$, $C_{27}$, $C_{29}$, $C_{31}$, $C_{33}$, $C_{35}$ . . . are 0 (zero).

EXAMPLE 1

Figure 5:
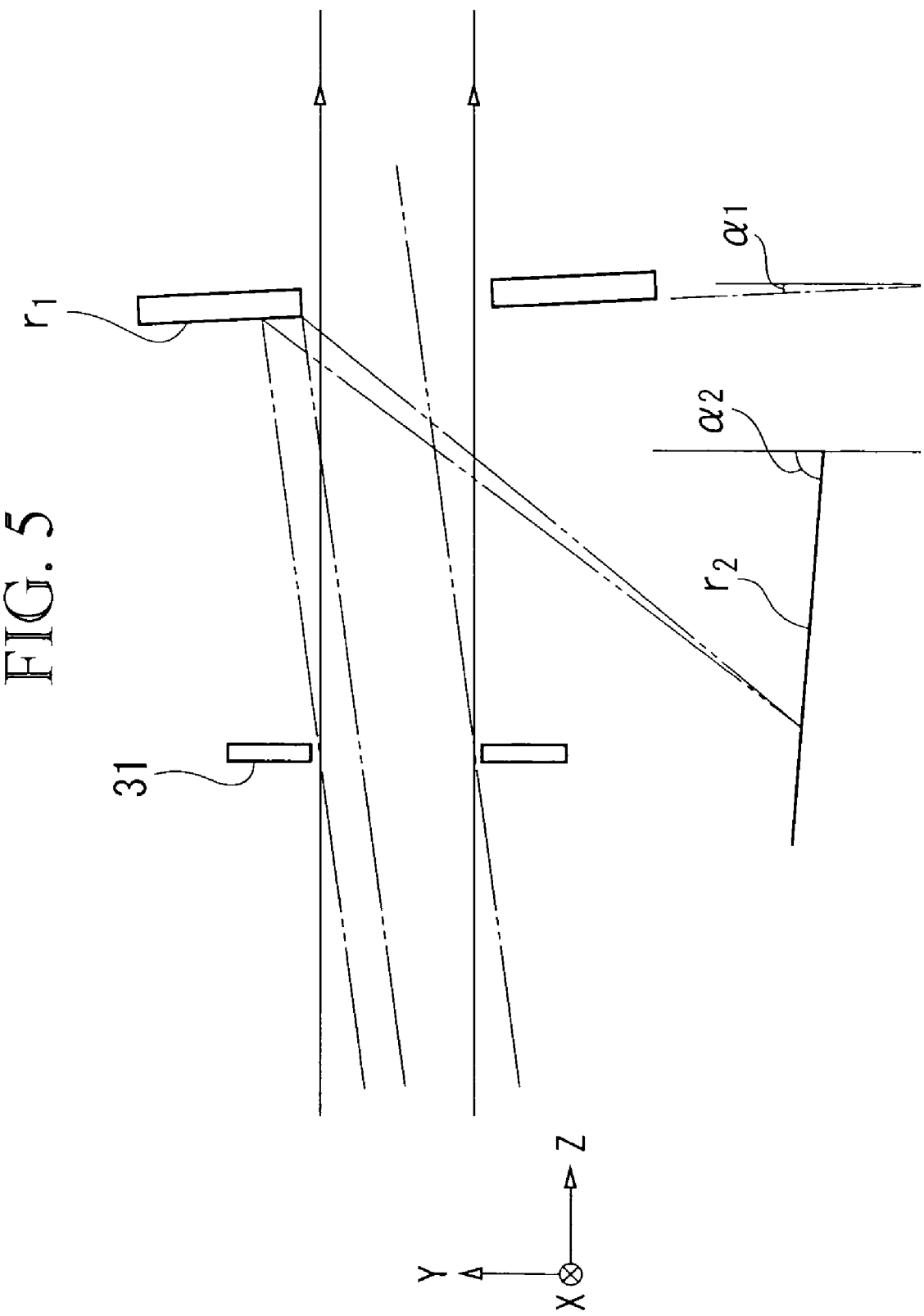
FIG. 5 is a view for an optical path in an optical system for a case in which a fresnel lens reflection surface is used for an optical element in the optical detection device and the optical system according to the present invention.
Figure 7A:
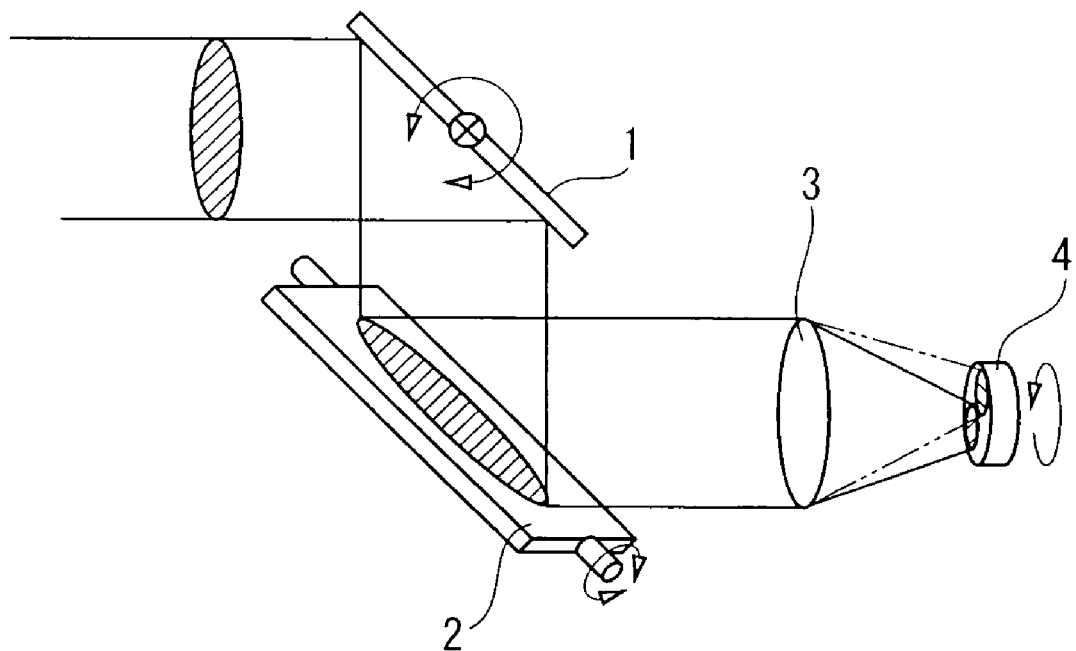
FIG. 7A is a view for a relationship between the position of the light receiving element and the position of the received light spot.
Figure 7B:
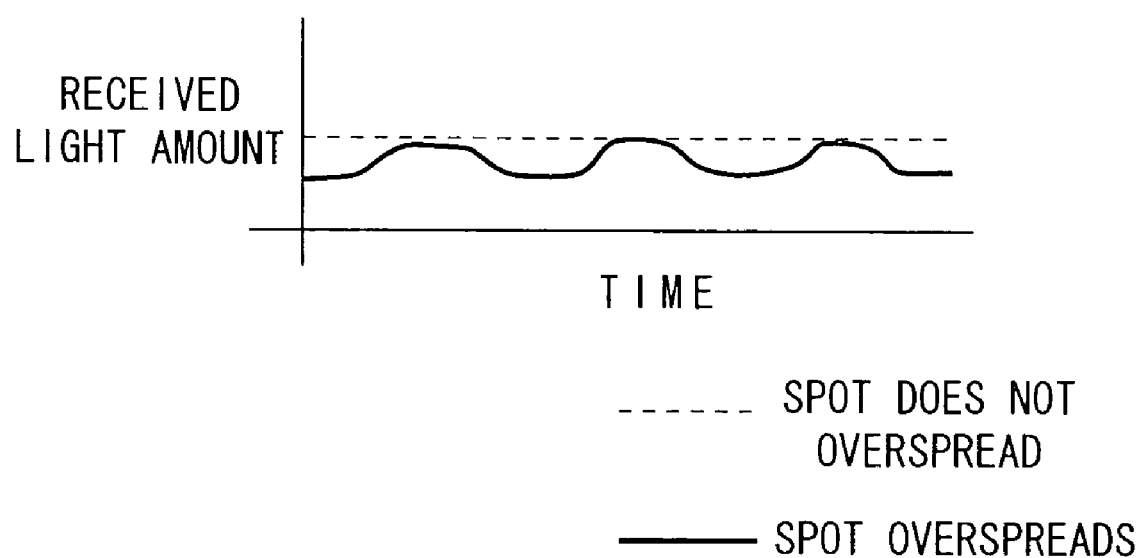
FIG. 7B is a view for showing an output signal which is outputted by the light receiving element.

Numerical limitations for a case in which a fresnel reflecting surface is used for an optical element are shown in FIG. 5. Reference numeral 31 indicates an aperture diaphragm.

| Surface No. | r | d | Decentralization |
| --- | --- | --- | --- |
| 1 | Aperture Surface | $d_1 = 0.00$ | |
| 2 | Fresnel Reflecting surface [$r_1$] | $D_2 = 0.00$ | Decentralization (1) |
| 3 | ∞(Image Surface) [$r_2$] | | Decentralization (2) |

| Fresnel Reflecting surface [$r_1$] | | | |
| --- | --- | --- | --- |
| Curvature | −16.62 | | |
| K | −1.3797 | | |
| a −3.7354 × $10^{-5}$ | b 5.186 × $10^{-7}$ | c −1.0439 × $10^{-8}$ | d 5.7655 × $10^{-11}$ |

| Decentralization (1) | | | | | |
| --- | --- | --- | --- | --- | --- |
| X | 0.00 | Y | −5.01 | Z | 5.18 |
| $\alpha_1$ | 7.00 | $\beta_1$ | 0.00 | $\gamma_1$ | 0.00 |

| Decentralization (2) | | | | | |
| --- | --- | --- | --- | --- | --- |
| X | 0.00 | Y | −7.00 | Z | −2.5 |
| $\alpha_2$ | 85.00 | $\beta_2$ | 0.00 | $\gamma_2$ | 0.00 |

In such a case, it is possible to form a flat optical element. Therefore, it is possible to form a small, light-weight device. Thus, a mass-production is possible such that the cost can be reduced.

EXAMPLE 2

Numerical limitations for a case in which a refracting reflecting surface surface is used for an optical element are shown in FIG. 6. Reference numeral 32 indicates an aperture diaphragm.

| Surface No. | r | D | Decentralization | $n_d$ | $v_d$ |
|---|---|---|---|---|---|
| 1 | Aperture Surface Refractive Reflecting Surface (F F S) [$r_3$] | $D_3$ = 20.00 | | | |
| 2 | | $D_4$ = 0.00 | | 1001.068 | −3.5 |
| 3 | ∞(Image Surface) [$r_2$] | | Decentralization (1) | | |

F F S [$r_1$]

$C_3$ −3.7924 × 10⁻⁴   $C_4$ −4.1412 × 10⁻⁶   $C_6$ −3.8132 × 10⁻⁶
$C_8$ 9.1325 × 10⁻⁹    $C_{10}$ 7.9132 × 10⁻¹⁰  $C_{11}$ 1.4989 × 10⁻¹⁰
$C_{13}$ 3.2546 × 10⁻⁹  $C_{15}$ −4.8971 × 10⁻¹¹
                       Decentralization (1)

| X | 0.00 | Y | −18.00 | Z | 3.00 |
| $\alpha_3$ | 90.00 | $\beta_3$ | 0.00 | $\Gamma_3$ | 0.00 |

In such a case, it is also possible to form a small, light-weight device similarly to a case in which a fresnel reflecting surface is used. Furthermore, it is not necessary to decentralize nor slant the optical surface; therefore, it is possible to form the device more compactly.

Here, in the above embodiments, it is possible to use the optical detection device and the optical system so as to detect the inclination of the optical system in the light receiving device which performs a tuning and tracking operation of the aerial optical communication desirably. For example, a part for a light transmitting device is formed by disposing an afocal optical system ahead or a galvano mirror 11 in the optical system 20 according to the present invention and disposing a beam splitter, a collimeter, lenses and a light source between the galvano mirror 11 and the optical path dividing section 12 which is disposed therebehind. A communication signal is emitted from the afocal optical system such that the communication signal progresses reversly to the direction of the incident light. Also, an end surface of a fiber for performing an optical communication and a photo-detector are disposed on the light receiving surface 14 so as to form a light receiving device by which it is possible to extract the communication signal from the received light. It is acceptable if two devices which can transmit and receive the light are disposed separately so as to face to each other so as to form an optical system which can perform an aerial optical communication bilaterally. By doing this, it is possible to handle a light which has a wide range of incident angle by moving the devices which can transmit and receive the light relatively so as to track the light.

THIRD EMBODIMENT

An optical tuning and tracking device according to a third embodiment of the present invention is explained. An optical capturing and tracking device according to the present embodiment comprises an optical device section and a light transmitting device section.

Figure 8:
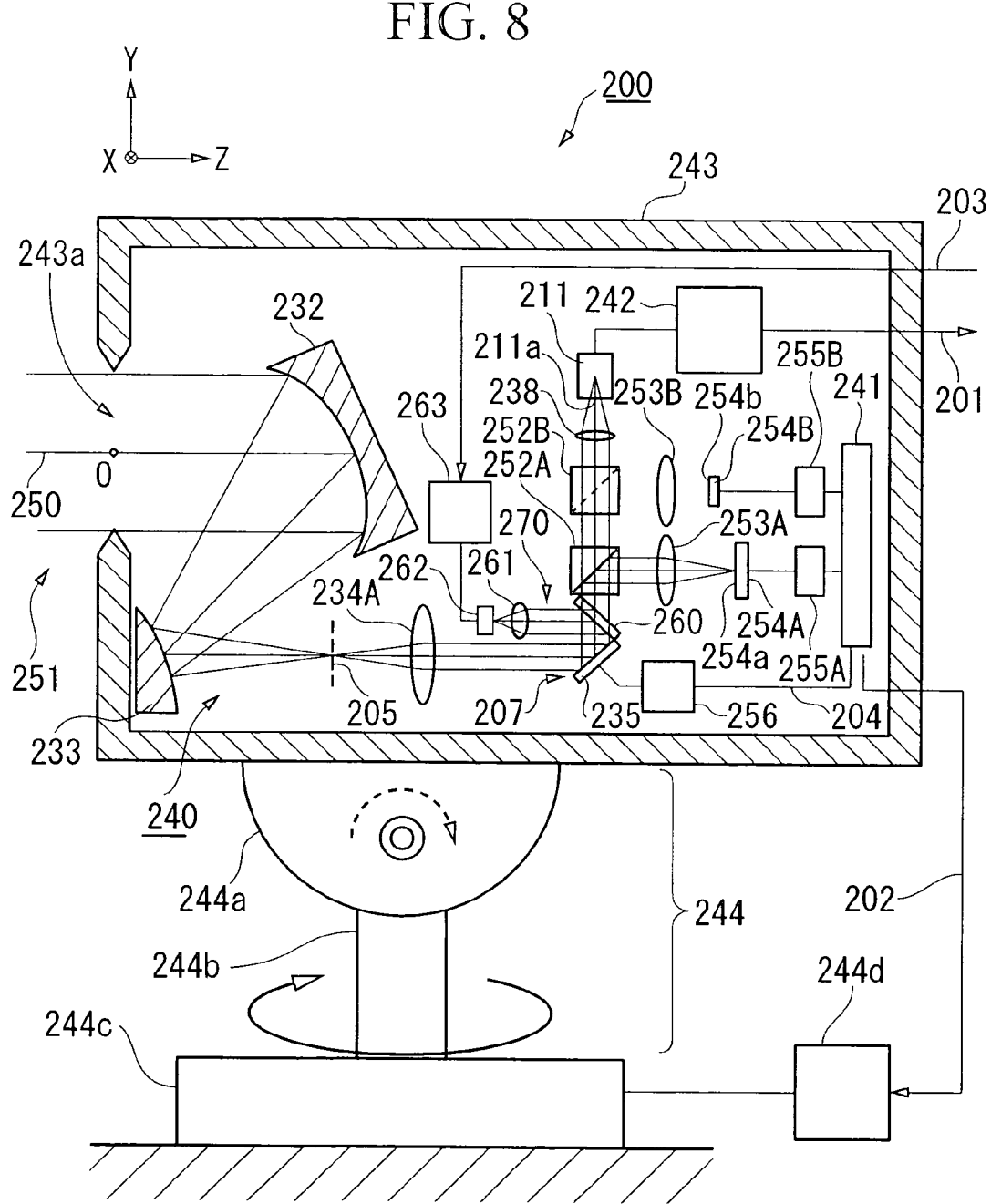
FIG. 8 is a cross section for explaining an example for a general structure of an optical capturing tracking device according to a third embodiment of the present invention.

FIG. 8 is a cross section for explaining a general structure for an example of the optical capturing and tracking device according to the third embodiment of the present invention.

An optical tracking device 200 (optical capturing and tracking device) according to a third embodiment of the present invention is explained. The optical tracking device 200 serves for transmitting and receiving the light such that an approximate parallel incident light can be tracked. In particular, the optical tracking device 200 can be preferably used in the aerial optical communication field.

First, a light receiving device section in the optical tracking device 200 is explained.

In a general structure, the light receiving device section in the optical capturing device 200 is provided with a casing 43 (enclosure of the device), a decentralized optical system 240, a control device 241, a deflection control device 256, a movable reflecting element 235, an input signal control device 242, and a Gimbal stage 244 (tracking and moving structure).

In the decentralized optical system 240, decentralized optical system 242, 233 and a lens 234 which has a positive power which can condense a light, and beam splitters 252A, 252B (optical elements which have apertures through which for passing the light beam so as to reflecting a part of the light beam toward the light receiving element 54B when the light beam is deviated from the predetermined optical axis) are disposed between the movable reflecting element 235 and the light condensing device 238. The beam splitters 252A and 252B are disposed from near side of an object to far side of the object. Also light condensing lens 253A (light condensing device), a light receiving device 254A, a light condensing lens 253B (light condensing device), and a light receiving device 254B are disposed on the divided optical path respectively.

In the light receiving device section in the optical tracking device 200 according to the present embodiment, as long as the direction of the incident light flux 251 is in an appropriate range, the incident light flux 251 is incident into the aperture diaphragm 243a. The incident light flux 251 has a larger diameter than the diameter of the aperture diaphragm 243a. If the incident perspective angle fluctuates, the aperture diaphragm 243a is disposed inside of the diameter of the light flux under an ordinary usage condition. In such a case, the incident light flux 251 which is incident into the aperture diaphragm 243a traces an optical path in the decentralized optical system 20 so as to be focused on the light receiving surface 211a. Consequently, the detection output of the light receiving device 211 is sent to the input signal control device 242, the input signal 201 is transmitted outside of the device. Here, in an initial condition, the deflection angle by the movable reflecting element 235 is fixed in a neutral position in which an axial principal light reaches at a center of the receiving surface 21.

Also, an approximate parallel light flux which is divided by the beam splitter 252A (252B) is condensed by an optical lens 253A (253B) so as to reach to the light receiving device 254A (254B). Consequently, the detection output which corresponds to the light receiving position is sent to the incident direction detection device 255A (255B).

On the other hand, if the optical path of the incident light flux 251 fluctuates or the position of the casing 243 is inappropriate; that is, if there is an incident perspective angle against the aperture diaphragm 243a, the position on the light receiving surface deviates respectively.

In such a case, the incident direction detection device 255B calculates a rotating amount (deflecting amount) of the movable reflecting element 235 according to the relationship between the incident light flux 251 which is determined by an optical characteristics of the decentralized optical system 240 and the light receiving position on the light receiving surface 254b so as to send a control signal 204 to the control device 241 and the deflection control device 256. In addition, a tracking operation is performed by controlling the movable reflecting element 235. In such a case, the moving amount of the Gimbal stage 244 is controlled by the control device 241 such that the incident perspective angle should be within a range which can be detected by the incident direction detection device 255B.

In such a case, the incident direction detection device 255A calculates a moving amount of the casing 243 according to the relationship between the incident light flux 251 which is determined by an optical characteristics of the decentralized optical system 240 and the light receiving position on the light receiving surface 254a so as to send a control signal 202 to the driving control device 244d and the control device 241. If the calculation result exceeds a certain range of the detection range, the incident direction detection device 255a notifies to the control device 241 such a condition. The incident direction detection device 255A has a wide range of detection capability; thus, it is possible to detect the position by controlling the Gimbal stage 244 according to the signal from the incident direction detection device 255A.

As explained above, the optical detection device and the optical system of the present invention can measure the inclination of the optical axis of the light which has a wide range of incident angle. Also, an entire light beam can be received on the light receiving surface without a loss in the signal light.

According to this invention, the received optical beam passes through an aperture section before reaching to the light receiving surface. If the optical axis of the optical beam coincides the predetermined optical axis, the entire optical beam passes through the aperture section so as to be received in the light receiving surface without loss. Therefore, there is not a loss in the detected light. On the other hand, if the optical axis of the optical beam is different from the predetermined optical axis, a part of the optical beam exceeds from the aperture section. The optical element is provided around the aperture section; therefore, the exceeded light is reflected by the optical element so as to be detected by the light receiving element.

By doing this, it is possible to measure the direction of the inclination of the optical beam and the amount of the inclination of the optical beam according to a detected position of the optical beam on the light receiving element by reflecting the light by the optical element even if the incident angle is too large to receive the light on the light receiving surfaces. Therefore, it is possible to compensate the inclination of the optical axis of the optical beam so as to correspond to a wide range of the incident angle by adjusting the optical beam such that the optical beam should not be detected by the light receiving element according to the measurement result.

According to the present invention, the optical beam which exceeds from the aperture section is reflected by the optical element while being received by the optical element. Therefore, the reflected light is received so as to be detected as an optical spot on the light receiving element. As a result, it is possible to measure the direction of the inclination of the optical beam and the inclination amount more accurately.

According to the present invention, a part of the optical beam which exceeds from the aperture section is reflected by the reflecting surface which is disposed on a surface of the prism. Consequently, the reflected light is received on a curved surface of the prism which has a function for receiving a light. Therefore, it is possible to allocate the reflecting function and the light receiving function on different surfaces; thus, it is possible to set the inclination of these surfaces and the curvatures of these surfaces desirably.

According to the present invention, it is possible to divide the optical beam which exceeds from the aperture section in a direction which is different from the incident optical axis easily.

According to the present invention, it is possible to form a flat optical element; therefore, it is possible to realize a small, light-weight optical detection device. In particular, if the optical element has a refracting surface, it is possible to form the device without decentralizing nor slanting the optical surfaces. Therefore, it is possible to realize a furthermore compact optical detection device.

According to the resent invention, it is possible to form the optical surfaces of the optical element without slanting nor decentralizing the optical surfaces of the optical element; therefore, it is possible to form the device easily.

According to the present invention, if the optical beam exceeds from the aperture section, the deflection angle of the optical deflecting element and the angle of the stage are controlled by the control device according to the detection signal by the light receiving element. By doing this, the entire optical beam are forced to be disposed inside of the aperture section.

Therefore, the optical axis of the optical beam is compensated without reducing the amount of the optical beam; thus, it is possible to prevent the S/N ratio from reducing.

What is claimed is:

1. An optical detection device comprising:
    an optical path dividing section which is disposed on an optical path toward a light condensing surface on which an optical beam is condensed, the light condensing surface having a first light receiving element; and
    a second light receiving element which receives the optical beam which is divided by the optical path dividing section, wherein
    the optical path dividing section is provided with an aperture section through which the optical beam passes under the condition that an optical axis of the optical beam coincides with a predetermined optical axis which is disposed toward the first light receiving element and an optical element which is disposed around the aperture section so as to reflect a portion of the optical beam to the second light receiving element when the optical axis of the optical beam is deviated from the predetermined optical axis.

2. An optical detection device according to claim 1, wherein the optical element is provided with a light-condensing function.

3. An optical detection device according to claim 1, wherein
    the optical element is formed by a prism, which is provided with a reflecting surface on a surface of the prism, and a curved surface which has a function such that the optical beam which is reflected by the reflecting surface is condensed on the second light receiving element.

4. An optical detection device according to claim 2, wherein the optical element has rotatively asymmetric power with respect to the predetermined optical axis.

5. An optical detection device according to claim 2, wherein the optical element has a reflecting surface which has rotatively asymmetric power.

6. An optical detection device according to claim 2, wherein the optical element includes an aspherical reflecting surface.

7. An optical detection device according to claim 2, wherein the optical element includes a Fresnel reflecting surface.

8. An optical detection device according to claim 2, wherein the optical element includes a diffractive reflecting surface.

9. An optical detection device according to claim 2, wherein the optical element has a reflecting surface which is slanted or decentralized with respect to the predetermined optical axis.

10. An optical device comprising:
   the optical detection device according to any one of claims 1 to 9; and
   a control device for adjusting an incident angle of the optical beam into the optical path dividing section so as to coincide with the predetermined optical axis according to a detection signal generated by the light incident on the second light receiving element from the optical element in the optical detection device.

11. An optical device comprising:
   the optical detection device according to any one of claim 10; and
   a deflection-angle-adjustable optical deflecting element for deflecting the optical beam, wherein the control device controls the deflection angle which is deflected by the deflection-angle-adjustable optical deflecting element.

12. An optical device comprising: the optical detection device according to claim 10, wherein the optical detection device is mounted on a stage, and the control device adjusts an angle of the stage.

* * * * *

UNITED STATES PATENT AND TRADEMARK OFFICE
CERTIFICATE OF CORRECTION

| | | |
|---|---|---|
| PATENT NO. | : 7,059,781 B2 | Page 1 of 1 |
| APPLICATION NO. | : 10/872497 | |
| DATED | : June 13, 2006 | |
| INVENTOR(S) | : Toshiaki Suzuki | |

It is certified that error appears in the above-identified patent and that said Letters Patent is hereby corrected as shown below:

Title Page, Item [57] Line 10 Change "bam" to -- beam --.

| Column | line | |
|---|---|---|
| 3 | 64 | Change "deviding" to -- dividing --; |
| 9 | 36 | Change "collimeter" to -- collimator --; |
| 9 | 40 | Change "systerm" to -- system --; |
| 9 | 41 | Change "reversly" to -- reversely --; and |
| 14 | 2 | Change "according to any one of claim 10;" to -- according to claim 10; --. |

Signed and Sealed this

Thirty-first Day of October, 2006

JON W. DUDAS
*Director of the United States Patent and Trademark Office*